United States Patent
Andrews et al.

(10) Patent No.: US 10,630,550 B2
(45) Date of Patent: Apr. 21, 2020

(54) METHOD FOR DETERMINING A PRIMARY MANAGEMENT SERVICE FOR A CLIENT DEVICE IN A HYBRID MANAGEMENT SYSTEM BASED ON CLIENT TELEMETRY

(71) Applicant: DELL PRODUCTS, LP, Round Rock, TX (US)

(72) Inventors: Carlton A. Andrews, Austin, TX (US); Girish S. Dhoble, Austin, TX (US); Joseph Kozlowski, Hutto, TX (US)

(73) Assignee: Dell Products, L.P., Round Rock, TX (US)

( * ) Notice: Subject to any disclaimer, the term of this patent is extended or adjusted under 35 U.S.C. 154(b) by 110 days.

(21) Appl. No.: 15/871,644

(22) Filed: Jan. 15, 2018

(65) Prior Publication Data

US 2019/0222475 A1    Jul. 18, 2019

(51) Int. Cl.
*G06F 15/16*        (2006.01)
*H04L 12/24*        (2006.01)

(52) U.S. Cl.
CPC ............ *H04L 41/085* (2013.01); *H04L 41/04* (2013.01); *H04L 41/0695* (2013.01)

(58) Field of Classification Search
CPC .... H04L 41/085; H04L 41/044; H04L 67/125
See application file for complete search history.

(56) References Cited

U.S. PATENT DOCUMENTS

| | | | | |
|---|---|---|---|---|
| 6,195,680 B1 * | 2/2001 | Goldszmidt | ............ | H04L 12/56 709/203 |
| 6,810,259 B1 * | 10/2004 | Zhang | ..................... | H04W 8/18 455/435.1 |
| 7,197,660 B1 * | 3/2007 | Liu | ..................... | G06F 11/2035 714/4.12 |
| 7,827,248 B2 * | 11/2010 | Oyadomari | ............. | H04L 43/50 709/208 |
| 8,185,624 B2 * | 5/2012 | Pal | ............................ | G06F 8/61 705/51 |
| 9,479,990 B1 * | 10/2016 | Chen | ............... | H04W 36/00835 |
| 9,680,833 B2 | 6/2017 | Dulce et al. | | |
| 2002/0161868 A1 * | 10/2002 | Paul | ....................... | G06F 9/4416 709/221 |
| 2003/0005096 A1 * | 1/2003 | Paul | ....................... | G06F 9/4416 709/222 |
| 2003/0023964 A1 * | 1/2003 | Rajaram | ............. | G06F 9/44521 717/172 |
| 2005/0105533 A1 * | 5/2005 | Malolepsy | ........ | H04L 29/06027 370/395.41 |

(Continued)

OTHER PUBLICATIONS

"What is Microsoft Intune?," Skyler Sedate, Nathan Barnett, Mike Tillman, Microsoft Corp., Jul. 27, 2017; p. 1-8; https://docs.microsoft.com/en-us/intune/introduction-intune.

*Primary Examiner* — Douglas B Blair

(74) *Attorney, Agent, or Firm* — Larson Newman, LLP

(57) ABSTRACT

A first device management system is assigned to have primary responsibility for management of an information handling system. A record of operating characteristics of the information handling system is maintained by a process executing at the information handling system. Primary responsibility for management of the information handling system is transitioned from the first device management system to a second device management system based on rule based analysis of the operating characteristics.

20 Claims, 9 Drawing Sheets

(56) References Cited

U.S. PATENT DOCUMENTS

| | | | | |
|---|---|---|---|---|
| 2005/0228856 A1* | 10/2005 | Swildens | ............... | G06F 9/50 |
| | | | | 709/200 |
| 2006/0187914 A1* | 8/2006 | Gumaste | ............... | H04L 61/106 |
| | | | | 370/389 |
| 2007/0168690 A1* | 7/2007 | Ross | ............... | G06F 11/0712 |
| | | | | 714/4.11 |
| 2008/0025378 A1* | 1/2008 | Mahany | ............... | H04B 1/707 |
| | | | | 375/150 |
| 2009/0177877 A1* | 7/2009 | Holdaway | ............... | G06F 9/44505 |
| | | | | 713/2 |
| 2009/0222677 A1* | 9/2009 | Astigarraga | ............... | G06F 11/2007 |
| | | | | 713/300 |
| 2009/0276512 A1* | 11/2009 | Holdaway | ............... | G06F 9/4405 |
| | | | | 709/223 |
| 2009/0276513 A1* | 11/2009 | Holdaway | ............... | G06F 9/5061 |
| | | | | 709/223 |
| 2009/0276612 A1* | 11/2009 | Holdaway | ............... | G06F 11/2025 |
| | | | | 713/1 |
| 2013/0145452 A1* | 6/2013 | Ollukaren | ............... | H04L 63/0272 |
| | | | | 726/15 |
| 2014/0173565 A1 | 6/2014 | Scholl et al. | | |
| 2015/0263885 A1 | 9/2015 | Kasturi et al. | | |
| 2016/0036628 A1* | 2/2016 | Gupta | ............... | H04W 4/70 |
| | | | | 455/420 |
| 2017/0322787 A1 | 11/2017 | Patidar et al. | | |
| 2019/0036875 A1* | 1/2019 | Jimenez | ............... | H04L 67/34 |

\* cited by examiner

METHOD FOR DETERMINING A PRIMARY MANAGEMENT SERVICE FOR A CLIENT DEVICE IN A HYBRID MANAGEMENT SYSTEM BASED ON CLIENT TELEMETRY

FIELD OF THE DISCLOSURE

This disclosure generally relates to information handling systems, and more particularly relates to determining a primary management service for a client device in a hybrid management system based on client telemetry.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A first device management system may be assigned to have primary responsibility for management of an information handling system. A record of operating characteristics of the information handling system may be maintained by a process executing at the information handling system. Primary responsibility for management of the information handling system is transitioned from the first device management system to a second device management system based on rule based analysis of the operating characteristics. Primary responsibility for management of the information handling system may transition between device management systems as deemed appropriate by the rule based analysis.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

System management refers to enterprise-wide administration of distributed information handling systems. As the number of data processing devices utilized by businesses and other organizations has grown, centralized management has proven to be more efficient than earlier ad hoc management techniques. When the majority of information handling systems consisted of desktop computers coupled to a primary data network, system management was straight forward. However, our workplace environments are evolving. An increasing number of employees work remotely from the centralized business network, and the proliferation of mobile devices significantly compounds system management complexity. Furthermore, a particular device may at times be directly connected to the enterprise network, while at other times the device may be coupled to a remote network, such as a Wi-Fi, Internet, or cell-based network. Individual system management tools have been developed to address specific requirements and capabilities associated with each of these connectivity schemes. FIGS. 1-8 illustrate techniques for migrating primary system management responsibility between available device management systems. In particular, an information handling system can collect operating characteristics, such as network connectivity, location, user credentials, and the like, and this information can be used to select an optimal device management system.

Figure 1:
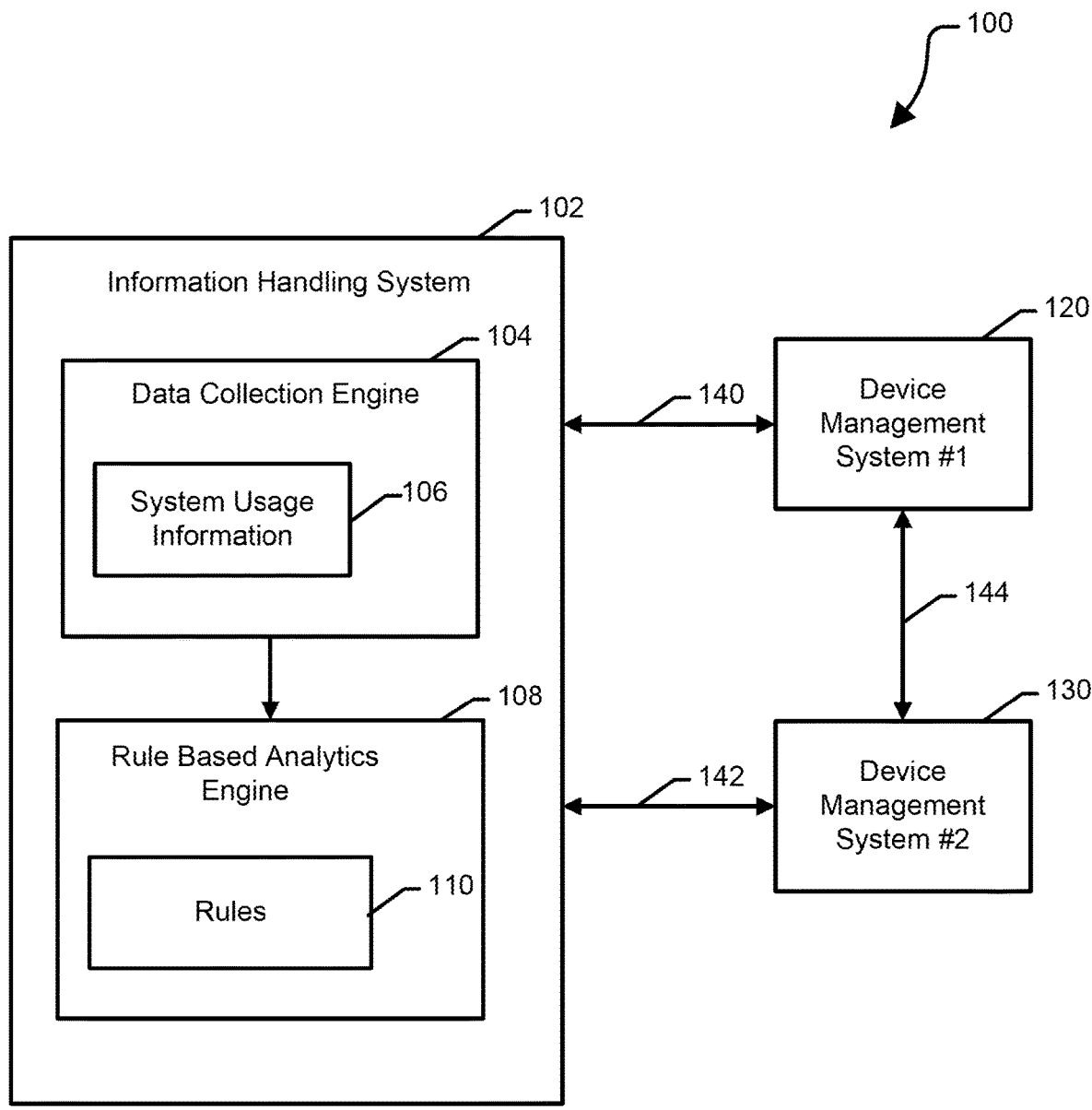
FIG. 1 is a block diagram of a client management system according to a specific embodiment of the present disclosure.

FIG. 1 shows a client management system 100 according to a specific embodiment of the present disclosure. System 100 includes an information handling system 102, a first device management system 120, and a second device management system 130. Information handling system 120 includes a data collection engine 104 to generate and store system usage information 106, and a rule based analytics engine 108 and associated rules 110. Information handling system 102 is communicatively coupled to device management system 120 via a network 140 and to device management system 130 via a network 142. Device management system 120 and device management system 130 are communicatively coupled via a network 144. In an embodiment, device management system 120 and device management system 130 can represent processes running on a data processing device resident at an enterprise facility. In another embodiment, device management systems 120 and 130 can be provided at disparate locations. For example, one or more of device management systems 120 and 130 can include cloud-based resources. At any particular time, one or more of networks 140, 142, and 144 may be inaccessible or otherwise absent. In one embodiment, network 140 can include a hardwired Ethernet network installed at an enterprise facility, and network 142 can include one or more wired or wireless communications networks, such as a Wi-Fi, Internet, or cell-based network. However the techniques disclosed herein can be implemented using any one or combination of communications network systems.

Device management system 120 and device management system 130 can be different in so far as their overall capabilities, network access, and functional advantages and disadvantages. For example, device management system 120 and network 140 may provide high-speed and high-volume data transfer rates that is ideal for installing large software applications on information handling system 102, but can only be utilized when system 100 is physically connected to network 140. In contrast, device management system 130 and network 142 may provide mobile connectivity and support, but have limited data transfer capabilities.

System management can include a wide variety of tasks that begin at deployment of a new information handling system and continue throughout the usage lifetime of the system. As used herein, a device management system is an automated or semi-automated application providing administration of information handling systems. A device management system can include a user interface to allow an information technology (IT) professional or technician to deploy, monitor, update, and otherwise maintain one or more information handling systems. A device management system may also be referred to as a system configuration manager, operations manager, system administration system, and the like. A device management system can provide a centralized management solution to help reduce the cost of ownership associated with an inventory of information handling systems at a business or other enterprise.

A device management system, such as device management systems 120 and 130, can provide initial provisioning of an information handling system, including installation and configuring of application programs and policies, installation of operating systems and basic input/output (BIOS) firmware, and the like. After an information handling system is operational, the device management system can monitor inventory, compliance, accessibility, and health of the system. The device management system can be responsible for updating BIOS and device drivers, performing operating system updates, managing software installation and removal, performing data backup tasks, and the like. In the event of a failure or another type of problem at information handling system 102, a device management system can be responsible for restoring lost or corrupted software and data, reinstalling an operating system, BIOS, and security credentials, and alerting an IT professional of issues requiring manual intervention. Accordingly, a device management system is typically responsible for driving consistency and conformance to security requirements and thereby reducing the risks associated with connected devices that need to be monitored and protected from unauthorized access or other performance vulnerabilities. The myriad of tasks performed by a device management system can include varying degrees of urgency and complexity. Device management systems 120 and 130 may provide unique management capabilities. Accordingly, it can be beneficial to transfer primary management responsibility from one device management system to another based on the tasks that are needed and based on operational characteristics of the information handling system maintained by data collection engine 104.

During operation, data collection engine 104 monitors a predetermined set of operating characteristics and can store the collected system usage information 106 at a memory device resident at, or accessible to, information handling system 102. Examples of system usage information include availability of a primary or secondary communications network; how long information handling system 102 has been connected to a primary communications network; how long system 102 has been connected to a communications network other than a primary communications network; a physical location of system 102; connection history at a particular logical network identifier (SSID), local area network (LAN) or wide area network (WAN) address, internet protocol (IP) address, virtual private network (VPN), and the like; user credentials such as position or security level; bandwidth requirements of a system management task, device management system connectivity history; processor activity; battery usage; software installations and uninstallations; docking and undocking of system 102 at a hardwired network device; and the like.

Rule based analytics engine 108 is responsible for evaluating system usage information 106 and determining if and when to transfer primary management responsibility to an alternative device management system based on rules 110. Rules 110 can include a provision policy established for information handling system 102, economic cost of providing system management associated with each device management system, information regarding priorities associated with security and administrative tasks, and the like. For example, in a scenario where an important security update needs to be installed immediately at system 102, device management system 120 currently has primary responsibility for managing system 102, but network 140 is currently unavailable, rule based analytics engine 108 can initiate transfer of primary management responsibility to device management system 130. In the preceding example, information handling system 102 can initiate and transfer management responsibility. In a particular embodiment, rule based analytics engine 108 and rules 110 can be located at one or more of device management systems 120 and 130, in which case a device management system can receive system usage information 106 from information handling system 102 and initiate or transfer management responsibility based on the usage information received from information handling system 102 and based on analytics rules 110. In an embodiment, rule based analytics engine 108 can be included at information handling system 102 and further replicated at one or more of device management systems 120 and 130, so either system 102 or a device management system can initiate or transfer management responsibility for system 102.

Figure 2:
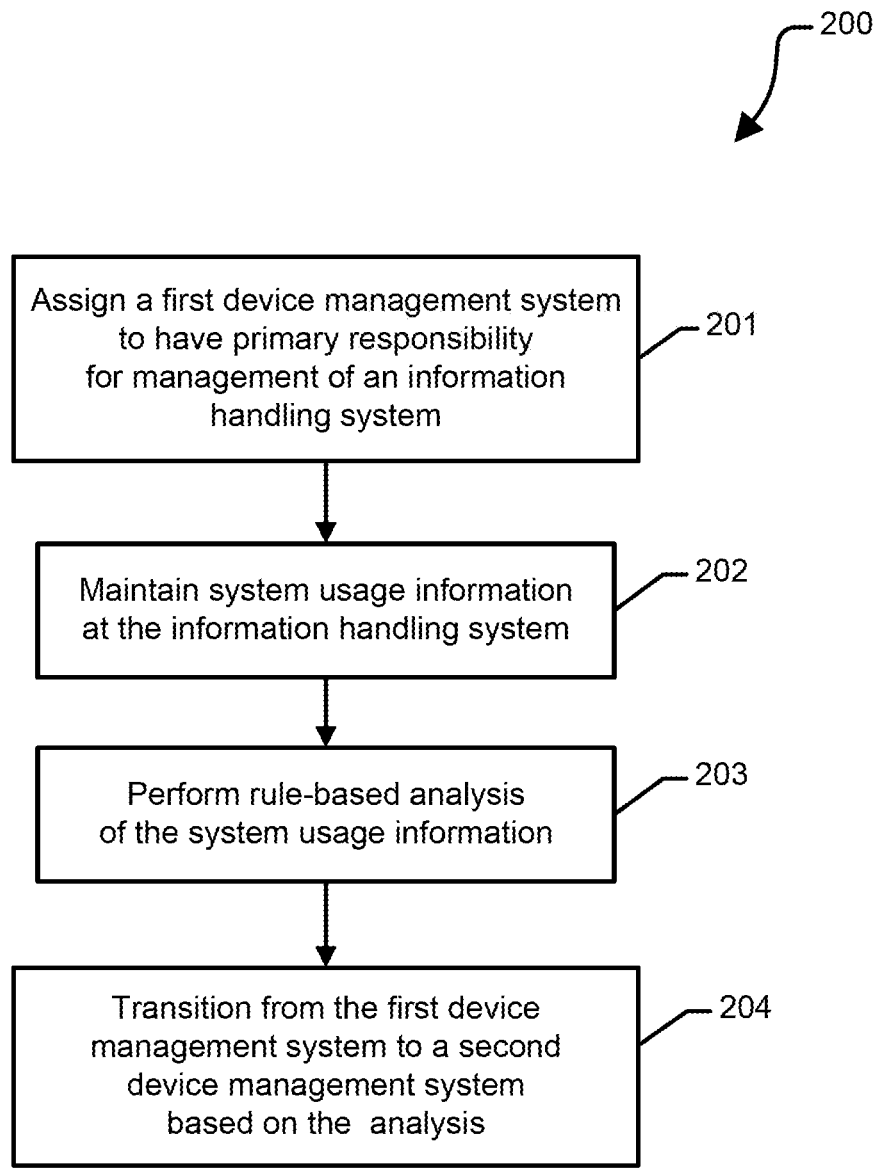
FIG. 2 is a flow diagram of a method for assigning a device management system according to a specific embodiment of the present disclosure.

FIG. 2 shows a method 200 for assigning a device management system according to a specific embodiment of the present disclosure. In particular, method 200 identifies how to select an appropriate device management system based on how an information handling system is being used. Method 200 begins at block 201 where a first device management system is assigned to have primary responsibility for management of an information handling system. For example, device management system 120 may be selected to provide management services for information handling system 102. At block 202, the information handling system maintains system usage information, as described above. For example, information handling system 102 can execute a software process, such as data collection engine 104, that collect and store system usage information 106. In an embodiment data collection engine 104 can be provided at a baseboard management controller or similar support processor. Furthermore, the baseboard management controller can be capable of providing out of band access at information handling system 102. As used herein, out of band operation refers to the ability to perform operations independent of operation of a primary central processor at information handling system 102. Out of band management can allow a device management system to provide management services at information handling system 102 even if an operating system at information handling system 102 is not loaded or is not operational. Alternatively, data collection engine 104 can be implemented by a central processing unit at information handling system 102, a chassis management controller, and the like.

Method 200 continues at block 203 where rule based analysis of the collected system usage information is performed. For example, rule based analytics engine 108 can evaluate system usage information 106 based on a predetermined set of rules included at rules 110. The complexity or details of rules 110 can vary based on the discretion of an IT professional, and rules instantiated at one information handling system can be different that rules instantiated at other systems. At block 204, primary management responsibility is transitioned from the first device management system to a second device management system based on the analysis performed at block 203. Additional rules can specify criteria for transferring primary management responsibility back to the first device management system. Similar to data collection engine 104, rule based analytics engine 108 can be implemented by a baseboard management controller or similar support processor, or by a central processing unit at information handling system 102.

Rule sets may vary based on the type of computer, identify or assignment of a user of a computer, and the like. For example, a laptop computer assigned to an executive at a corporation, who travels on business frequently, can include rules that dictate that as soon as the laptop is disconnected from a hardwired office network, that primary management responsibility is transferred from a corporate device management system to a cloud-based device management system that can maintain communications with the laptop using one or more wireless communications networks. In contrast, rules may dictate that transfer to an alternative device management system does not occur until a corresponding information handling system has been disconnected from the office network for a predetermined amount of time. Other rules my dictate that once primary management responsibility is transferred to an alternate device management system, the alternative device management system remains the primary device management system for a specified period of time. In still another example, service provided by a device management system that supports Internet-facilitated communication may require a monthly subscription fee, so a rule may specify that once primary management responsibility has once been transferred to the wireless device management system, that subsequent transfers from and to the wireless device management system can be performed more frequently than if the subscription has not yet been established. Rules may indicate transferring management responsibility based on the urgency of an identified operational characteristic, such as a need to update security software or in response to identifying malicious activity. The preceding examples are merely a few scenarios that can be implemented based on system usage information 106 and rules 110.

Management tasks performed by a device management system, such as security related updates, can be time-critical. Techniques disclosed herein can help maintain connection of an information handling system to a device management system so that critical management tasks can be completed as quickly as possible. Without the use of these techniques for migrating to and from alternative device management systems, functionality of information handling system 102 can be at risk.

Figure 3:
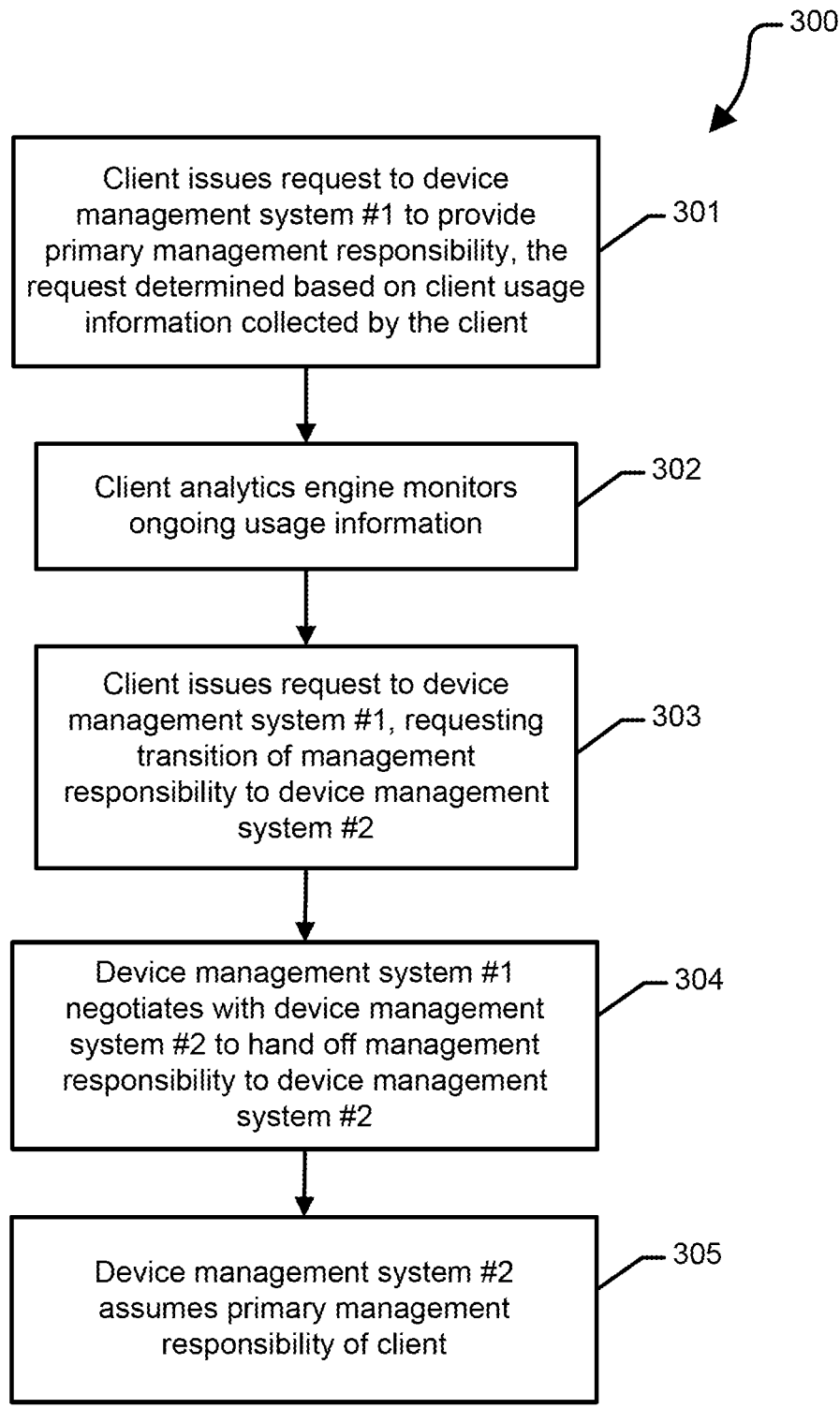
FIG. 3 is a flow diagram of a method for assigning a device management system according to a specific embodiment of the present disclosure.

FIG. 3 shows a method 300 for assigning a device management system according to another embodiment of the present disclosure. Method 300 illustrates one way that device management systems can coordinate with a client information handling system to provide management services and to transfer management services to another device management system. At block 301, a client information handling system issues a request to a first device management system to provide primary management services, the request determined based on client usage information collected by the client. For example, information handling system 102 can utilize system usage information 106 and rules 110 to determine that device management system 120 is the preferred device management system at the present time. At block 302, a rule based analytics engine at the client monitors ongoing usage information collected by the client. At block 303, the client issues a request to the device management system that is presently providing management services, the request to transition primary management responsibility to an alternative device management system. For example, system usage information 106 collected by information handling system 102 may indicate that information handling system 102 is now predominately connected to the Internet via a home router, while it was previously receiving network connectivity from a workplace network. Based on rules 110, rule based analytics engine 108 can determine that device management system 130 can provide better management services.

Method 300 continues at block 304 where the first device management system negotiates with the alternative device management system to hand off management responsibility to the alternative device management system. At block 305, the alternative device management system assumes primary management responsibility for client management. In the embodiment illustrated by method 300, device management system 120 can be recognized as a master device management system that is responsible for coordinating transfer of the primary management responsibility to device management system 130. In an embodiment, device management system 120 may also be responsible for reestablishing primary management services by requesting that device management system 130 stand down. Alternatively, the particular device management system that presently has primary management responsibility for a client can control and negotiate transfer of management service to another device management system.

Figure 4:
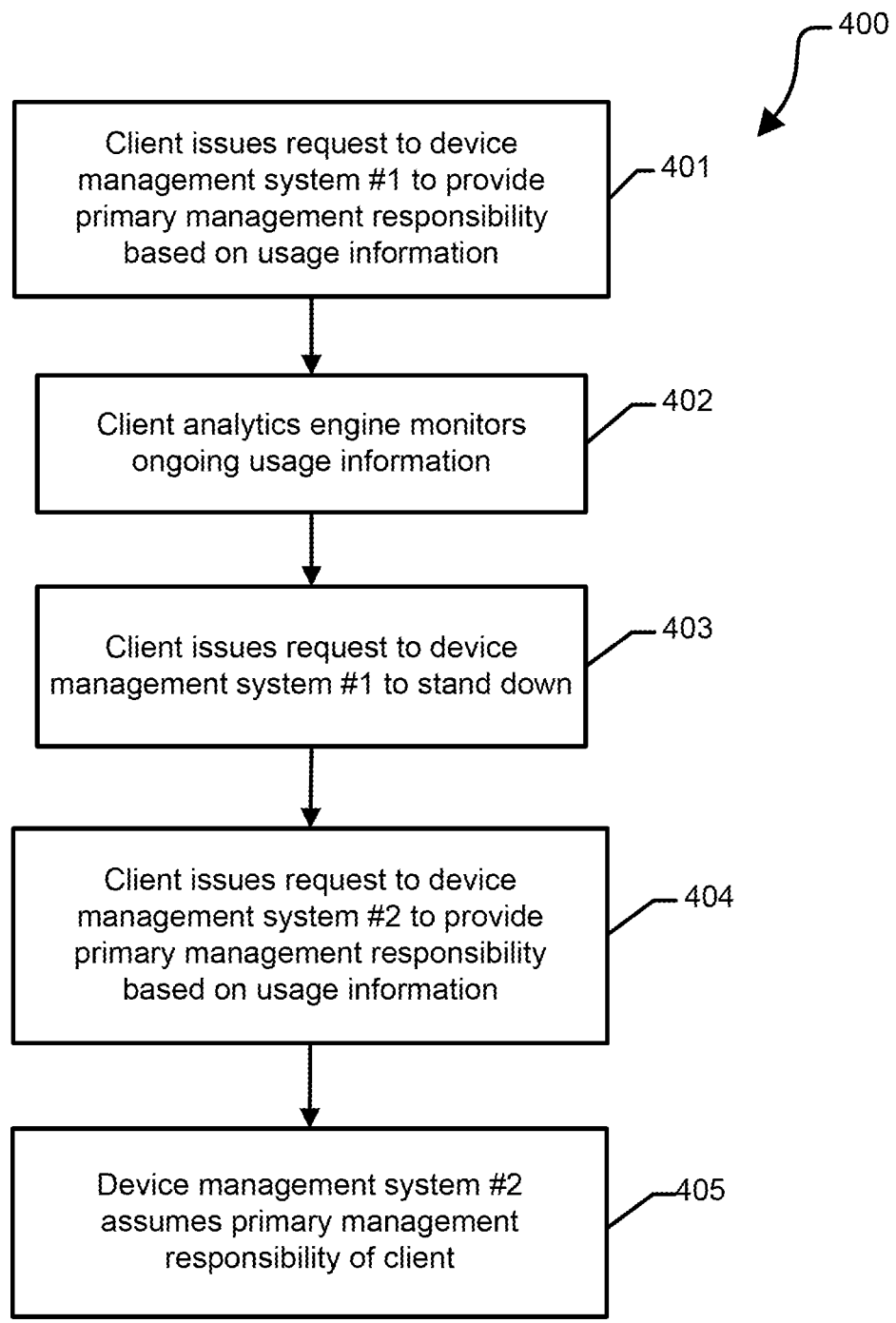
FIG. 4 is a flow diagram of a method for assigning a device management system according to another embodiment of the present disclosure.

FIG. 4 shows a method 400 for assigning a device management system according to another embodiment of the present disclosure. In particular, method 400 illustrates an embodiment in which the client information handling system has control of which device management system provides management services. At block 401, a client information handling system issues a request to a first device management system to provide primary management services, the request determined based on client usage information collected by the client. At block 402, a rule based analytics engine at the client monitors ongoing usage information collected by the client. At block 403, the client issues a request to the first device management system to stand down in response to analyzing the collected usage information and determining that an alternative device management system can provide superior service. At block 404, the client issues a request to an alternative device management system to provide primary management responsibility. At block 405, the alternative device management system assumes primary management responsibility of the client. While a client device can be given control over the selection of a primary device management system, the ultimate determination can be maintained by one or more of the device management systems.

Figure 5:
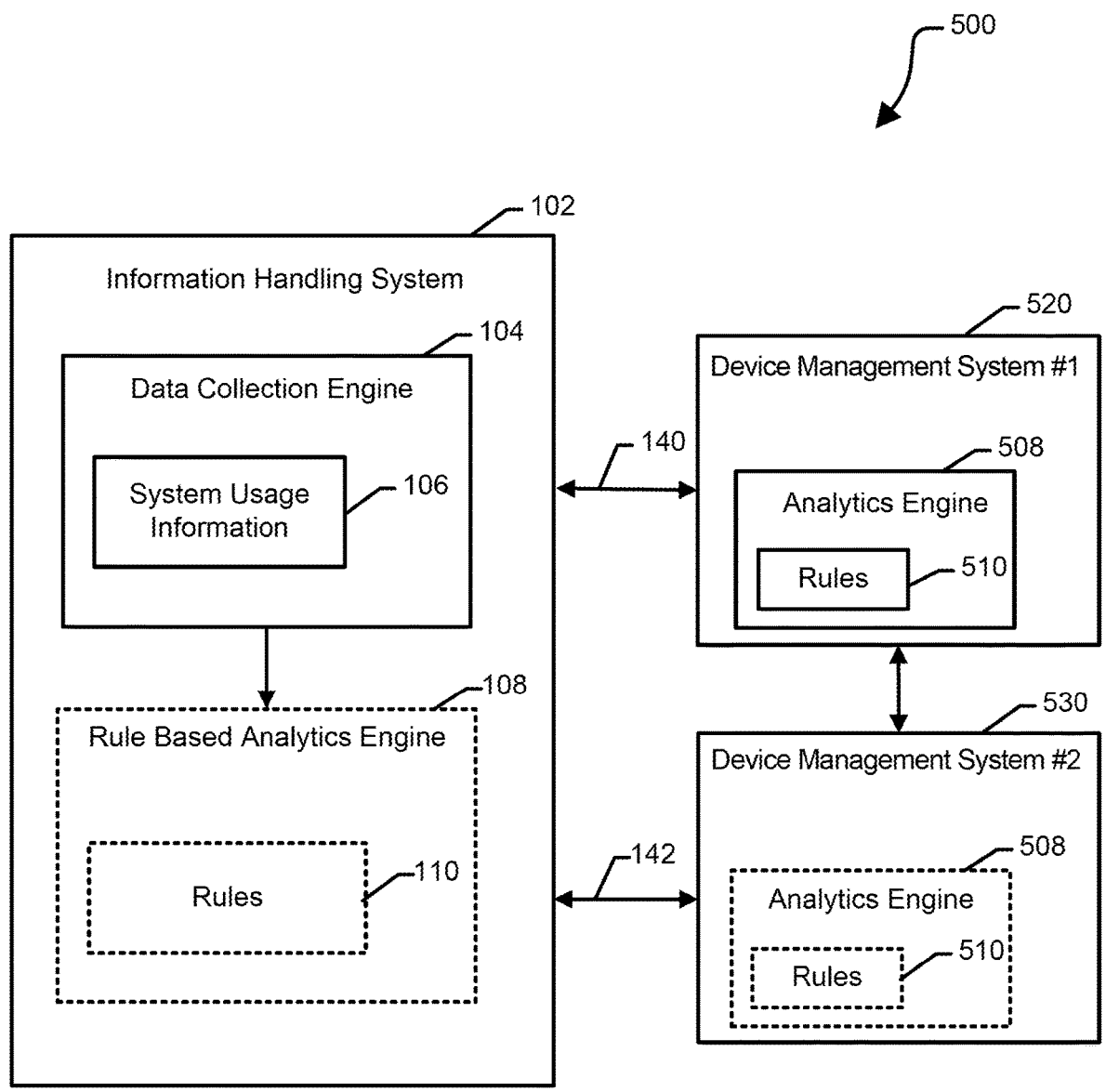
FIG. 5 is a block diagram of a client management system according to another embodiment of the present disclosure.

FIG. 5 shows a client management system 500 according to another embodiment of the present disclosure. System 500 is similar to system 100 of FIG. 1, except that one or more of device management systems includes a rule based analytics engine. In particular, device management system 520, and optionally device management system 530, includes a rule based analytics engine 508 and associated rules 510. In an embodiment, information handling system 102 may or may not include analytics engine 108. Accordingly, the determination of which device management system is to provide primary management responsibility for information handling system 102 can be performed by one or both of device management systems 520 and 530. For example, rule based analytics engine 508 at device management system 520 can receive system usage information from information handling system 102, and determine which of a plurality of device management systems is best suited to provide primary system management of information handling system 102. Operation of system 500 can be better understood with reference to FIGS. 6a and 6b, below.

Figure 6A:
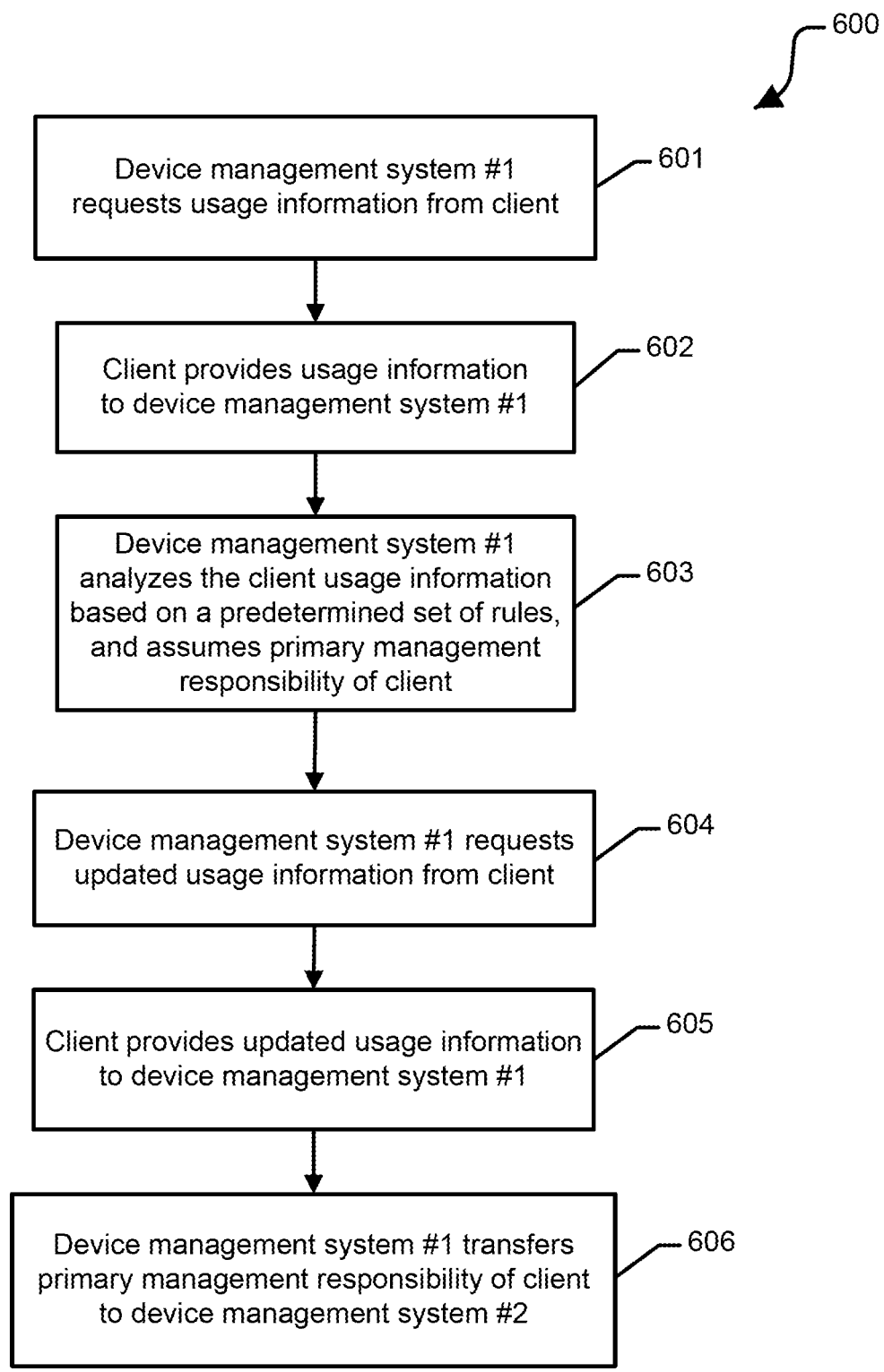
FIGS. 6a and 6b are flow diagrams of a method for assigning a device management system according to still another embodiment of the present disclosure.

FIG. 6a shows a method 600 for assigning a device management system according to still another embodiment of the present disclosure. Method 600 illustrates an embodiment where rule based analytics engine 108 is implemented or replicated by one or more device management systems. Data collection engine 104 remains implemented by information handling system 102. Method 600 begins at block 601 where a first device management system requests usage information from a client device. For example, device management system 520 can request that information handling system 102 provide system usage information 106. At block 602, the client acknowledges the request by providing the system usage information to the first device management system. At block 603, the first device management system analyzes the provided client usage information based on a predetermined set of rules stored at the device management system. Based on the analysis, the first device management system assumes primary management responsibility for the client. For example, device management system 520 can utilize rule based analytics engine 508 and associated rules 510 to evaluate system usage information 106 provided by information handling system 102.

Method 600 continues at block 604 where the first device management system requests updated usage information from a client device, and at block 605, the client responds by providing the requested updated usage information to the first device management system. At block 606, the first device management system transfers primary management responsibility of the client to a second device management system. For example, assume that device management system 520 is optimized to provide management of mobile clients using a Wi-Fi network, while device management system 530 is optimized to provide services via an enterprise network. If rule based analytics engine 508 at device management system 520 analyzes system usage information provided by information handling system 102 and determines that system 102 is once again connected to the enterprise network, engine 508 can determine that device management system 530 can provide better management service, and transfer primary management responsibility to device management system 530. In one embodiment, a particular device management system can assume initial management responsibility for a client during provisioning and deployment of information handling system 102. Subsequently, usage information provided by information handling system 102 can be utilized to maintain current device management system responsibility, or to justify a transfer of management responsibility to an alternative device management system.

Figure 6B:
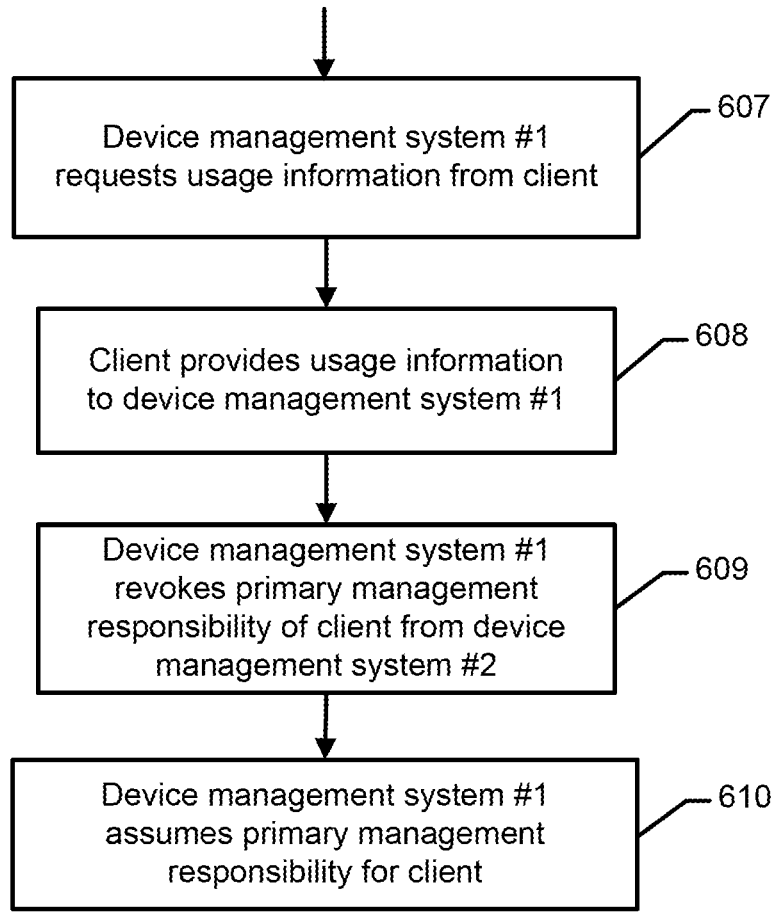

Method 600 continues at block 607 at FIG. 6b, where the first device management system once again requests usage information from the client device. At block 608, the client responds with the requested information. At block 609, the first device management system revokes primary management responsibility of the client from the second device management system based on the received usage information and based on rules 510. At block 610, the first device management system resumes primary management responsibility of the client. One of skill will appreciate that system 500 can be configured so that either the client or one or more of a plurality of device management systems has authority to evaluate system usage information 106 and assign management responsibility accordingly. One device management system can have authority over other device management systems with regard to assigning management responsibility to a client, or multiple device management systems can be configured to have substantially equal authority, wherein a request to transfer management responsibility from one device management system to another is arbitrarily granted. In one embodiment, primary management responsibility can be transferred to an alternate device management system if the current device management system is no longer able to communicate with the client.

Figure 7:
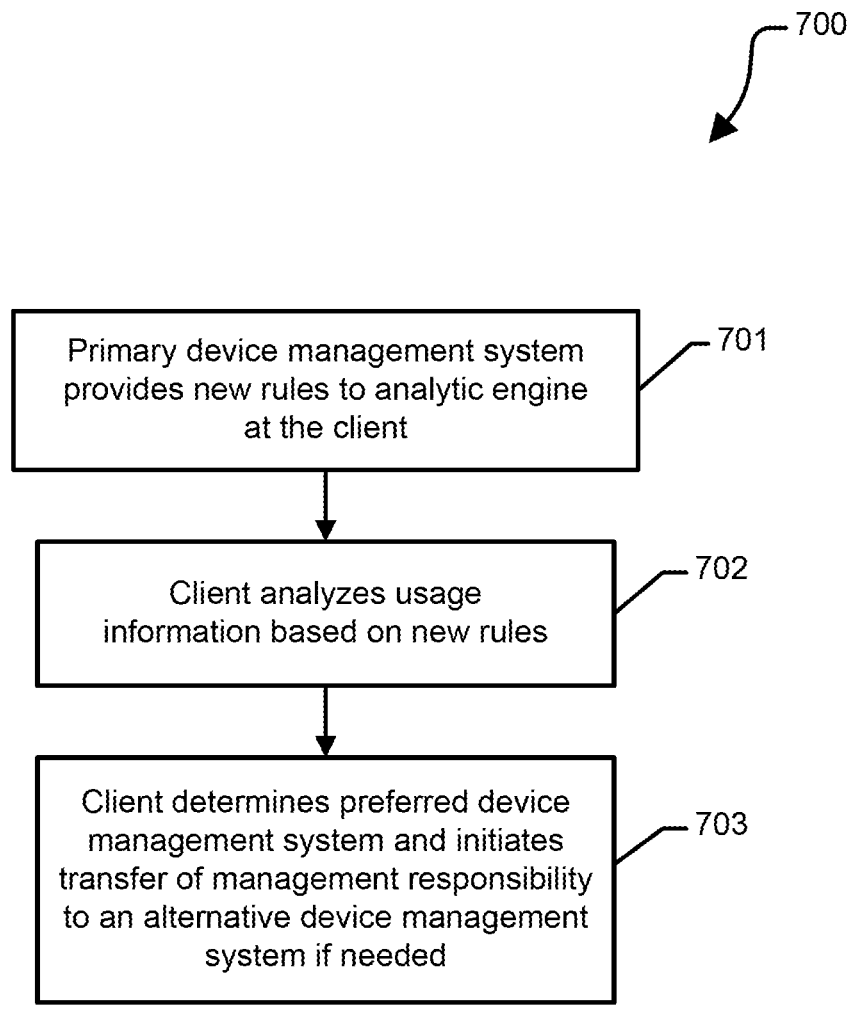
FIG. 7 is a flow diagram of a method for updating a rule set at an information handling system according to a specific embodiment of the present disclosure.

FIG. 7 shows a method 700 for updating a rule set at an information handling system according to a specific embodiment of the present disclosure. Method 700 begins at block 701 where a primary device management system provides new rules to the rule based analytics engine at a client information handling system. For example, device management system 120 can install rules 110 at information handling system 102, and provide updates to the rules as needed. Update can be provided by the device management system that currently has primary management responsibility for information handling system 102, or the update process can be reserved for when system 102 is once again managed by a principle device management system provided at the enterprise facility. At block 702, the client can analyze current usage information based on the updated rule set. At block 703, the client can determine a preferred device management system based on the analysis of the updated rules, and initiate transfer of management responsibility to an alternative device management system, if needed.

Figure 8:
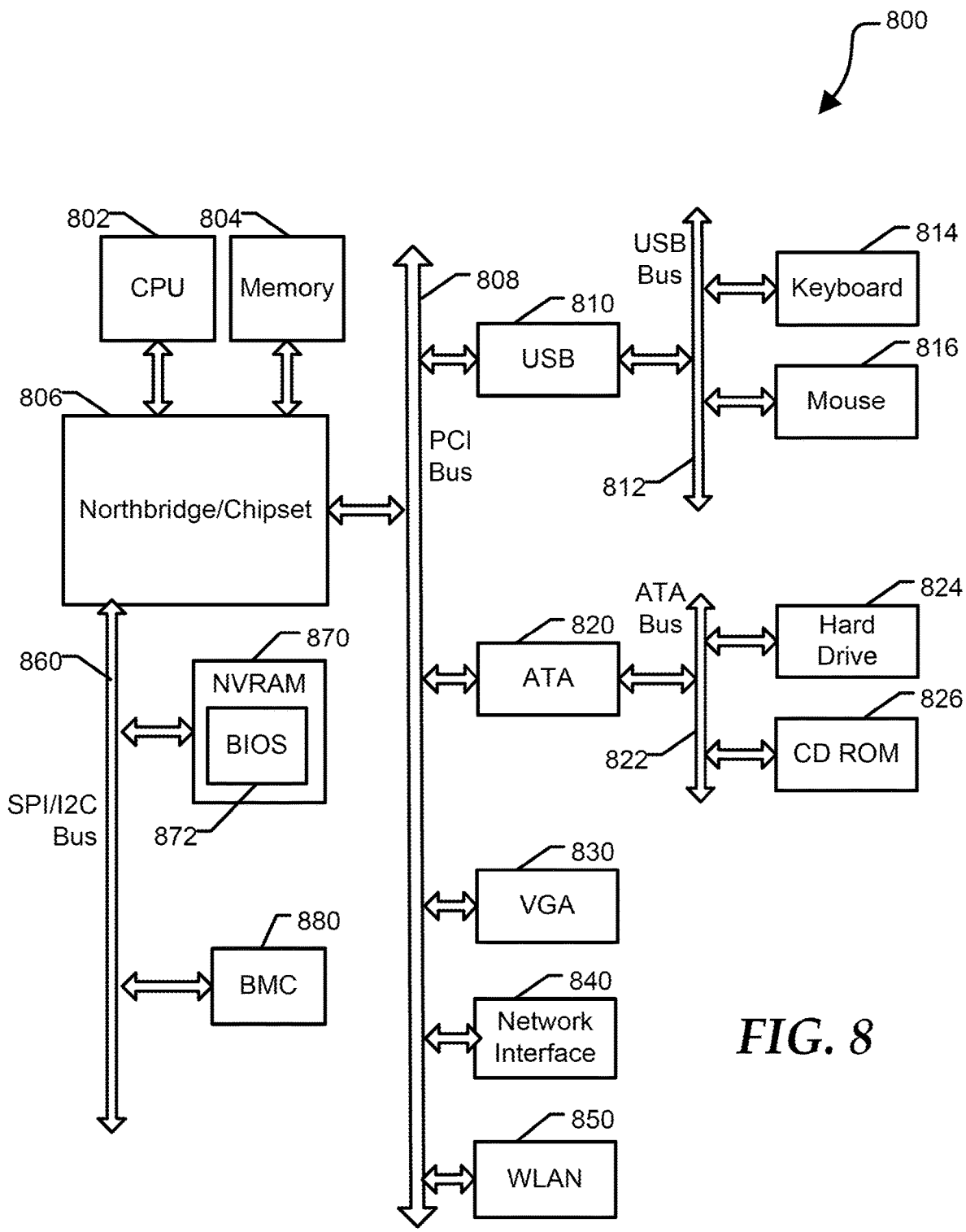
FIG. 8 is a block diagram of an information handling system according to an embodiment of the present disclosure.

FIG. 8 shows an information handling system 800 including a processor 802, a memory 804, a northbridge/chipset 806, a PCI bus 808, a universal serial bus (USB) controller 810, a USB 812, a keyboard device controller 814, a mouse device controller 816, a configuration an ATA bus controller 820, an ATA bus 822, a hard drive device controller 824, a compact disk read only memory (CD ROM) device controller 826, a video graphics array (VGA) device controller 830, a network interface controller (NIC) 840, a wireless local area network (WLAN) controller 850, a serial peripheral interface (SPI) bus 860, a NVRAM 870 for storing BIOS 872, and a baseboard management controller (BMC) 880. BMC 880 can be referred to as a service processor or embedded controller (EC). Capabilities and functions provided by BMC 880 can vary considerably based on the type of information handling system. For example, the term baseboard management system is often used to describe an embedded processor included at a server, while an embedded controller is more likely to be found in a consumer-level device. As disclosed herein, BMC 880 represents a processing device different from CPU 802, which provides various management functions for information handling system 800. For example, an embedded controller may be responsible for power management, cooling management, and the like. An embedded controller included at a data storage system can be referred to as a storage enclosure processor.

For purpose of this disclosure information handling system 800 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 800 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 800 can include processing resources for executing machine-executable code, such as CPU 802, a programmable logic array (PLA), an embedded device such as a System-on-a-Chip (SoC), or other control logic hardware. Information handling system 800 can also include one or more computer-readable medium for storing machine-executable code, such as software or data.

System 800 can include additional processors (not shown at FIG. 1) that are configured to provide localized or specific control functions, such as a battery management controller. Bus 860 can include one or more busses, including a SPI bus, an I2C bus, a system management bus (SMBUS), a power management bus (PMBUS), and the like. BMC 880 can be configured to provide out-of-band access to devices at information handling system 800. As used herein, out-of-band access herein refers to operations performed prior to execution of BIOS 872 by processor 802 to initialize operation of system 800.

BIOS 872 can be referred to as a firmware image, and the term BIOS is herein used interchangeably with the term firmware image, or simply firmware. BIOS 872 includes instructions executable by CPU 802 to initialize and test the hardware components of system 800, and to load a boot loader or an operating system (OS) from a mass storage device. BIOS 872 additionally provides an abstraction layer for the hardware, i.e. a consistent way for application programs and operating systems to interact with the keyboard, display, and other input/output devices. When power is first applied to information handling system 800, the system begins a sequence of initialization procedures. During the initialization sequence, also referred to as a boot sequence, components of system 800 are configured and enabled for operation, and device drivers can be installed. Device drivers provide an interface through which other components of the system 800 can communicate with a corresponding device.

Information handling system 800 can include additional components and additional busses, not shown for clarity. For example, system 800 can include multiple processor cores, audio devices, and the like. While a particular arrangement of bus technologies and interconnections is illustrated for the purpose of example, one of skill will appreciate that the techniques disclosed herein are applicable to other system architectures. System 800 can include multiple CPUs and redundant bus controllers. One or more components can be integrated together. For example, portions of northbridge/chipset 806 can be integrated within CPU 802. Additional components of information handling system 800 can include one or more storage devices that can store machine-executable code, one or more communications ports for communicating with external devices, and various input and output (I/O) devices, such as a keyboard, a mouse, and a video display. An example of information handling system 800 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

Information handling system 800 can include a set of instructions that can be executed to cause the information handling system to perform any one or more of the methods or computer based functions disclosed herein. The information handling system 800 may operate as a standalone device or may be connected to other computer systems or peripheral devices, such as by a network.

In a networked deployment, the information handling system 800 may operate in the capacity of a server or as a client user computer in a server-client user network environment, or as a peer computer system in a peer-to-peer (or distributed) network environment. The information handling system 800 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 800 can be implemented using electronic devices that provide voice, video or data communication. Further, while a single information handling system 800 is illustrated, the term "system" shall also be taken to include any collection of systems or sub-systems that individually or jointly execute a set, or multiple sets, of instructions to perform one or more computer functions.

The information handling system 800 can include a disk drive unit and may include a computer-readable medium, not shown in FIG. 8, in which one or more sets of instructions, such as software, can be embedded. Further, the instructions may embody one or more of the methods or logic as described herein. In a particular embodiment, the instructions may reside completely, or at least partially, within system memory 804 or another memory included at system 800, and/or within the processor 802 during execution by the information handling system 800. The system memory 804 and the processor 802 also may include computer-readable media.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories.

Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
    assigning a first device management system to have primary responsibility for management of a first information handling system;
    monitoring, by a process executing at the first information handling system, network connectivity at the first information handling system;
    maintaining a record of the network connectivity at the first information handling system; and
    transitioning primary responsibility for management of the first information handling system from the first device management system to a second device management system based on rule based analysis of the record of network connectivity,
    wherein the first and second device management systems are located remote from the first information handling systems and perform tasks of installing and maintaining of software at a plurality of distributed information handling systems including the first information handling system.

2. The method of claim 1, wherein the rule based analysis comprises evaluating the record of network connectivity based on a predetermined set of rules identifying a preferred device management system corresponding to one or more network connections.

3. The method of claim 1, wherein the record of network connectivity includes a logical network identifier identifying a first connected network.

4. The method of claim 1, wherein the first management system provides management capabilities that are not available at the second device management system.

5. The method of claim 1, further comprising transitioning from the second device management system to the first device management system based on an updated record of network connectivity of the first information handling system.

6. The method of claim 1, further comprising assigning the first device management system based on an initial record of the network connectivity.

7. The method of claim 1, wherein:
    the first device management system is operable to communicate with the first information handling system via a primary communication network; and
    the second device management system is operable to communicate with the first information handling system via a communication network other than the primary communication network.

8. The method of claim 1, wherein the transitioning is initiated by the first information handling system.

9. The method of claim 1, wherein the transitioning is initiated by the first device management system or the second device management system.

10. The method of claim 1, further comprising receiving the record of network connectivity at the first device management system, wherein the transitioning comprises the first device management system issuing a request to the second device management system, the request that the second device management system assume the primary responsibility for management of the first information handling system.

11. The method of claim 1, wherein the rule based analysis is performed by the first information handling system.

12. The method of claim 1, wherein the rule based analysis is performed by a device management system.

13. The method of claim 1, wherein the maintaining of the record and the rule based analysis is performed by a processor that provides out of band services at the first information handling system.

14. An information handling system comprising:
a processor; and
a memory to store instructions, the instructions executable by the processor to:
    assign a first device management system to have primary responsibility for management of the information handling system;
    monitor network connectivity at the information handling system;
    maintain a record of the network connectivity of the information handling system; and
    transition primary responsibility for management of the information handling system from the first device management system to a second device management system based on rule based analysis of the record of network connectivity, wherein the first and second device management systems are located remote from the information handling system and perform tasks of installing and maintaining of software at the information handling system.

15. The information handling system of claim 14, wherein the rule based analysis comprises evaluating the record of network connectivity based on a predetermined set of rules identifying a preferred device management system corresponding to one or more network connections.

16. The information handling system of claim 14, wherein the processor provides out of band services at the information handling system.

17. The information handling system of claim 14, wherein the first device management system is to communicate with the information handling system using exclusively a hardwired network and the second device management system is to communicate with the information handling system using an alternative network.

18. The information handling system of claim 14, wherein the record of network connectivity includes a logical network identifier identifying a first connected network.

19. The information handling system of claim 14, wherein the processor is further to transition from the second device management system to the first device management system based on an updated record of network connectivity of the information handling system.

20. An information handling system comprising:
a service processor to provide out of band services at the information handling system; and
a memory to store instructions, the instructions executable by the service processor to:
    assign a first device management system to have primary responsibility for management of the information handling system;
    monitor network connectivity at the information handling system;
    maintain a record of the network connectivity of the information handling system and
    transition primary responsibility for management of the information handling system from the first device management system to a second device management system based on evaluating the record of network connectivity and a set of rules identifying a preferred device management system corresponding to one or more network connections, wherein the first and second device management systems are located remote from the information handling system and perform tasks of installing and maintaining of software at the information handling system.

* * * * *